(12) United States Patent
Kerselaers (10) Patent No.: US 10,644,757 B1
(45) Date of Patent: May 5, 2020

(54) NEAR-FIELD COMMUNICATIONS DEVICE

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/253,266

(22) Filed: Jan. 22, 2019

(51) Int. Cl.
*H04B 1/10* (2006.01)
*H04B 13/00* (2006.01)
*H04B 5/00* (2006.01)

(52) U.S. Cl.
CPC ............. *H04B 5/0081* (2013.01); *H04B 1/10* (2013.01); *H04B 13/005* (2013.01)

(58) Field of Classification Search
CPC combination set(s) only.
See application file for complete search history.

(56) References Cited

U.S. PATENT DOCUMENTS

| | | | |
|---|---|---|---|
| 6,421,532 B1 | 7/2002 | Lindenmeier et al. | |
| 6,968,171 B2 | 11/2005 | Vanderhelm et al. | |
| 8,422,974 B2 | 4/2013 | Hahn | |
| 9,656,552 B2 | 5/2017 | Kautz | |
| 9,917,656 B1* | 3/2018 | van der Ploeg | H04B 1/1036 |
| 2011/0217925 A1* | 9/2011 | Rhodes | H04B 5/00 455/41.1 |
| 2011/0287789 A1* | 11/2011 | Yang | G01S 1/12 455/500 |
| 2013/0273845 A1* | 10/2013 | Bangs | H04B 5/0012 455/41.1 |
| 2015/0318624 A1* | 11/2015 | Schantz | G01S 5/14 343/867 |
| 2017/0062949 A1* | 3/2017 | Kerselaers | H04B 5/0031 |
| 2018/0006794 A1* | 1/2018 | Lee | H04L 5/14 |
| 2019/0162766 A1* | 5/2019 | Kerselaers | A61B 5/02 |

FOREIGN PATENT DOCUMENTS

| | | |
|---|---|---|
| DE | 10 212 009 432 A1 | 11/2012 |
| DE | 10 2016 203 938 A1 | 9/2017 |

OTHER PUBLICATIONS

Hwang, Jung-Hwan et al; "Effect of Electromagnetic Interference on Human Body Communication"; IEEE Transactions on Electromagnetic Compatibility, vol. 59, No. 1; 10 pages (Feb. 2017).
Saadeh, Wala et al; "A Pseudo OFDM With Miniaturized FSK Demodulation Body-Coupled Communication Transceiver for Binaural Hearing Aids in 65 nm CMOS"; IEEE Journal of Solid-State Circuits, vol. 52, No. 3; 12 pages (Mar. 2017).
Shinagawa, Mitsuru et al; "Noise Analysis for Near-Field Intra-Body Communication Systems"; IEEE International Instrumentation and Measurement Technology Conference; 6 pages (May 2006-Sep. 2013).

* cited by examiner

*Primary Examiner* — Ganiyu A Hanidu (57) ABSTRACT

One example discloses a near-field communications device, including: a receiver configured to be coupled to a first near-field antenna having a first radiation pattern, and to a second antenna having a second radiation pattern; wherein the first radiation pattern and the second radiation pattern are not spatially aligned; wherein the receiver is configured to subtract a second signal received from the second antenna from a first near-field signal received from the first near-field antenna.

20 Claims, 6 Drawing Sheets

NEAR-FIELD COMMUNICATIONS DEVICE

The present specification relates to systems, methods, apparatuses, devices, articles of manufacture and instructions for near-field communications.

SUMMARY

According to an example embodiment, a near-field communications device, comprising: a receiver configured to be coupled to a first near-field antenna having a first radiation pattern, and to a second antenna having a second radiation pattern; wherein the first radiation pattern and the second radiation pattern are not spatially aligned; wherein the receiver is configured to subtract a second signal received from the second antenna from a first near-field signal received from the first near-field antenna.

In another example embodiment, the first near-field signal includes a transmitted (TX) near-field signal from another near-field communications device; and the second signal includes an interference signal.

In another example embodiment, the second signal is an ambient noise signal.

In another example embodiment, the second signal is generated from at least one of: an electric motor, a radio, a light, a household appliance, a printer, a RFID device, or an NFC device.

In another example embodiment, the second antenna is a near-field antenna; and the second signal is a near-field signal.

In another example embodiment, the near-field communications device includes the first near-field antenna and the and second antenna.

In another example embodiment, the near-field communications device is a near-field electro induction (NFEI) device; and the near-field communications device is configured to a non-propagating quasi-static electric near-field signal.

In another example embodiment, the near-field communications device is a near-field electromagnetic induction (NFEMI) device; and the near-field communications device is configured to receive a non-propagating quasi-static magnetic near-field signal.

In another example embodiment, the first near-field antenna is responsive to both electric (E) near-fields and magnetic (H) near-fields; and the second antenna is responsive only to electric (E) near-fields.

In another example embodiment, the first radiation pattern and the second radiation pattern are substantially perpendicularly aligned.

In another example embodiment, the first near-field antenna has a first planar orientation; the second antenna has a second planar orientation; and the first planar orientation and the second planar orientation are not parallel to each other.

In another example embodiment, the first planar orientation and the second planar orientation are substantially perpendicular to each other.

In another example embodiment, the first planar orientation of the first near-field antenna is configured to be substantially parallel to a conductive structure; and the second planar orientation of the second near-field antenna is configured to be substantially perpendicular to the conductive structure.

In another example embodiment, the first near-field antenna includes at least two conductive surfaces; and one of the conductive surfaces is closer to the conductive structure.

In another example embodiment, the conductive structure is a human body.

In another example embodiment, further comprising an alignment circuit coupled to the second antenna; wherein the first near-field signal received from the first near-field antenna includes the second signal having a first amplitude and phase; wherein the second signal received from the second antenna has a second amplitude and phase; and wherein the alignment circuit is configured to adjust the second amplitude and phase to substantially match the first amplitude and phase.

In another example embodiment, further comprising a signal processor coupled to receive the first near-field signal received from the first near-field antenna and the second signal from the second antenna; and wherein the signal processor is configured to transmit a feedback signal to the alignment circuit that commands the alignment circuit to adjust the second amplitude and phase to substantially match the first amplitude and phase.

In another example embodiment, the receiver is configured to generate a third signal from subtraction of the second signal from a first near-field signal; the third signal includes the transmitted (TX) near-field signal from the another near-field communications device; further comprising a baseband circuit; wherein the baseband circuit is configured to decode and output the transmitted (TX) near-field signal.

In another example embodiment, the first near-field antenna functions as both a transmit (TX) and receive (RX) antenna, while the second antenna functions only as a receiver (RX) antenna.

In another example embodiment, the near-field communications device is embedded in at least one of: a wearable device, an earbud, a medical monitoring device, a smartwatch or an implant.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

BRIEF DESCRIPTION OF THE DRAWINGS

FIG. 3 is an example graph of received signal strength verses communication frequency for a body-worn (e.g. wearable) NFEI antenna.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are on body communication and communications with other wireless networked devices (e.g. Internet of Things (IoT) devices) based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished. Unfortunately, H-field based NFMI systems with small antenna coils have a limited range that may be much smaller than an entire wearable user's body. Such H-field communications are sensitive to coil orientation. In the case of a hearing aid form factor, a H-field induction based system cannot cover an entire human body. However, since in hearing aids both coils are always aligned with each other, they are not influenced by the movement of the human body.

Other wearables employ Near-field Electric Induction (NFEI)) as a wireless communication method. NFEI allows electronic devices on and near a conductive structure (e.g. a human body) to exchange information through E-field coupling (e.g. at 21 MHz). NFEI is also sometimes called Body Coupled Communication (BCC). While E-field based NFEI signals can have a greater range than H-field based NFMI signals, the E-field signal strength can vary with regard to body posture and is sensitive to body movements. The body can even partially block a capacitive return path, thereby increasing E-field channel loss and reliable and robust wireless communication is not possible.

Figure 1:
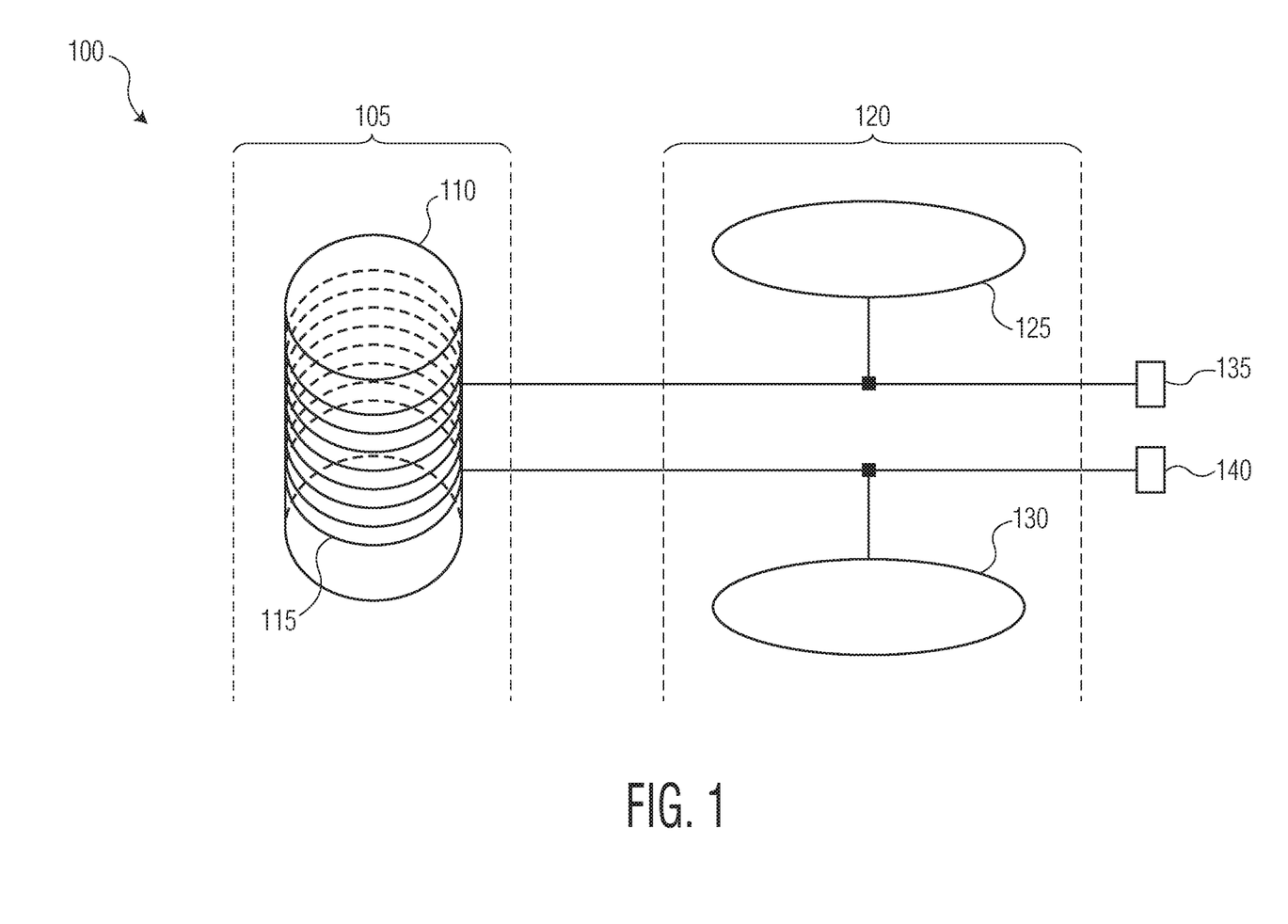
FIG. 1 is an example idealized near-field electromagnetic induction (NFEMI) antenna.

FIG. 1 is an example idealized near-field electromagnetic induction (NFEMI) antenna 100. In some example embodiments, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive loading structures 125 and 130. Antenna 100 feed points 135, 140 are coupled to various transceiver circuitry, such as downstream radio transmitter and receiver integrated circuit (RF-IC), (not shown here).

When the NFEMI antenna 100 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 2:
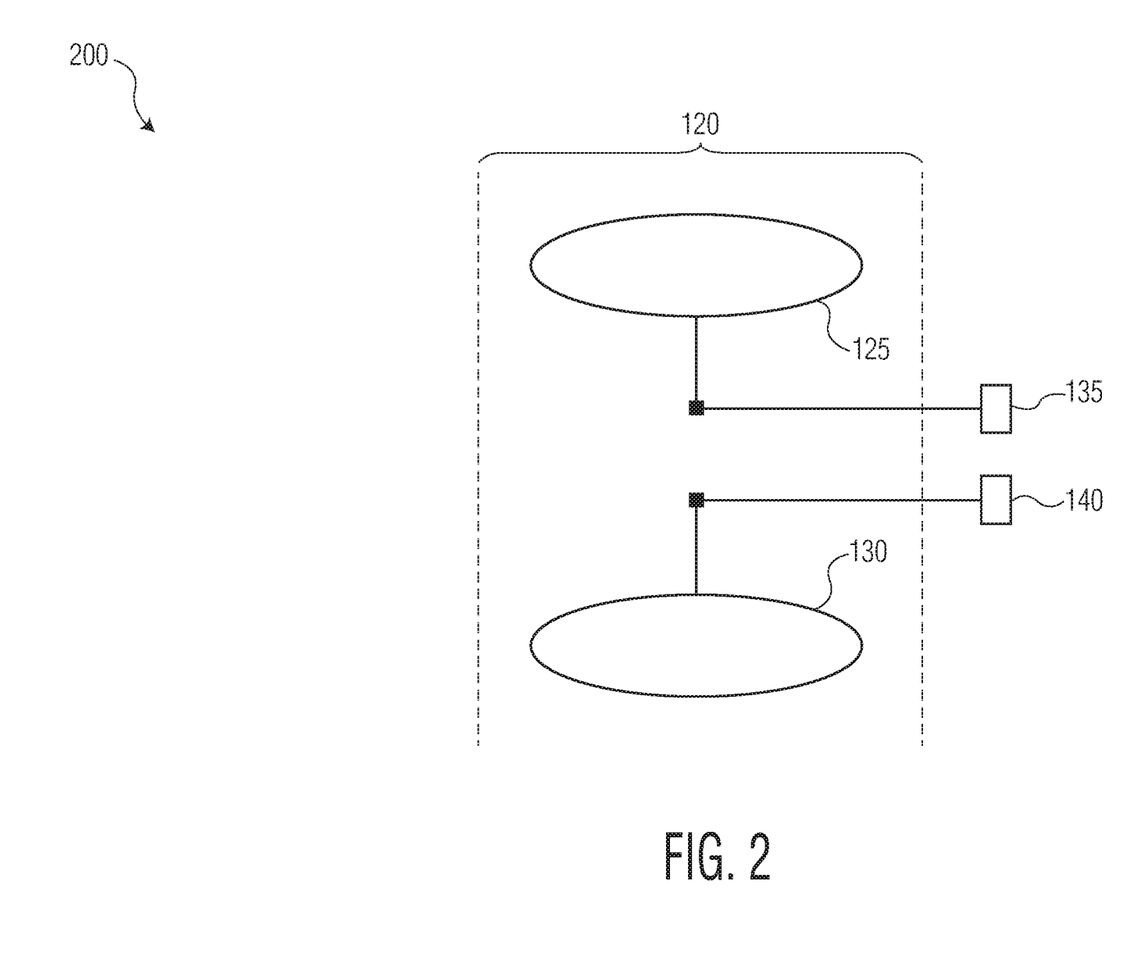
FIG. 2 is an example idealized near-field electro induction (NFEI) antenna.

FIG. 2 is an example idealized near-field electro induction (NFEI) antenna 200. In some example embodiments, the antenna 200 includes a short loaded dipole (E-field) antenna 120 for electric fields. The E-field antenna 120 includes two conductive loading structures 125 and 130. Antenna 200 feed points 135, 140 are coupled to various transceiver circuitry, such as downstream radio transmitter and receiver integrated circuit (RF-IC), (not shown here). In some example embodiments the transmit frequency is below 50 MHz to ensure that the near-fields are following the body contours and far field radiation is strongly reduced.

On-body NFEI communication, however, can be prone to electro-magnetic (EM) interference that occurs when unwanted radio frequency signals disrupt the near-field communications. Interference may prevent reception altogether, may cause only a temporary loss of a signal, or may affect the quality of the reception of the sound or data. The interference can come from a variety of sources, including nearby electric and electronic systems (e.g. light source regulation, household appliances, refrigerators, coffee machines, etc.).

For example, a human body acts as an antenna for some of these electro-magnetic interference signals because tissues composing the human body have a high dielectric constant under 80 MHz. Electromagnetic waves between 30 and 80 MHz have wavelengths comparable to a length of an entire human body all the way to various body parts, such as arms and legs.

Figure 3:
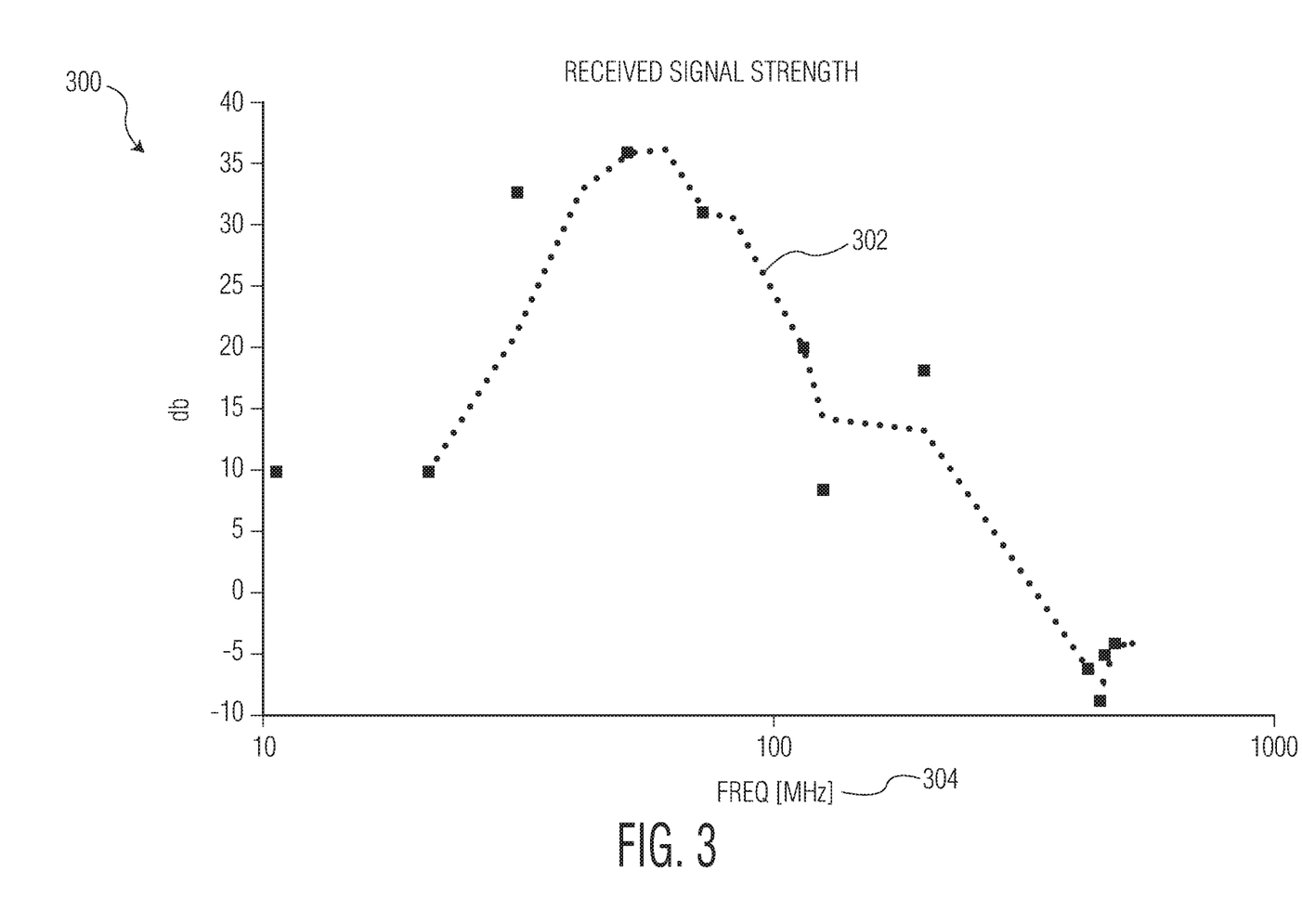
FIG. 3 is an example graph of received signal strength verses communication frequency for a body-worn NFEI antenna.

FIG. 3 is an example graph 300 of received signal strength 302 verses communication frequency 304 (i.e. log 10 scale) for a body-worn (e.g. wearable) NFEI antenna (e.g. short dipole antenna). The received signal strength 302 relative amplitude (dB) shows a susceptibility of a human body to received electromagnetic fields.

Electromagnetic wave frequencies below about 80 MHz induce currents into a human body, resulting in an electric field (E-field) vector perpendicular to surfaces of the body. As indicated by the graph 300, induced currents are relatively low at 10 MHz and is at a maximum at about 60 MHz. However, depending on the environment, strong E-field interference can also be found below 1 MHz, especially around 100 KHz (not shown here).

While such susceptibility can be beneficial for on-body NFEI communication devices, such susceptibility can cause unwanted signals to interfere with such NFEI communications. Now presented are circuits, devices, apparatus and methods for addressing these unwanted interference signals and improves a signal to noise ratio (SNR) and robustness of such E-field based near-field communications devices.

Figure 4:
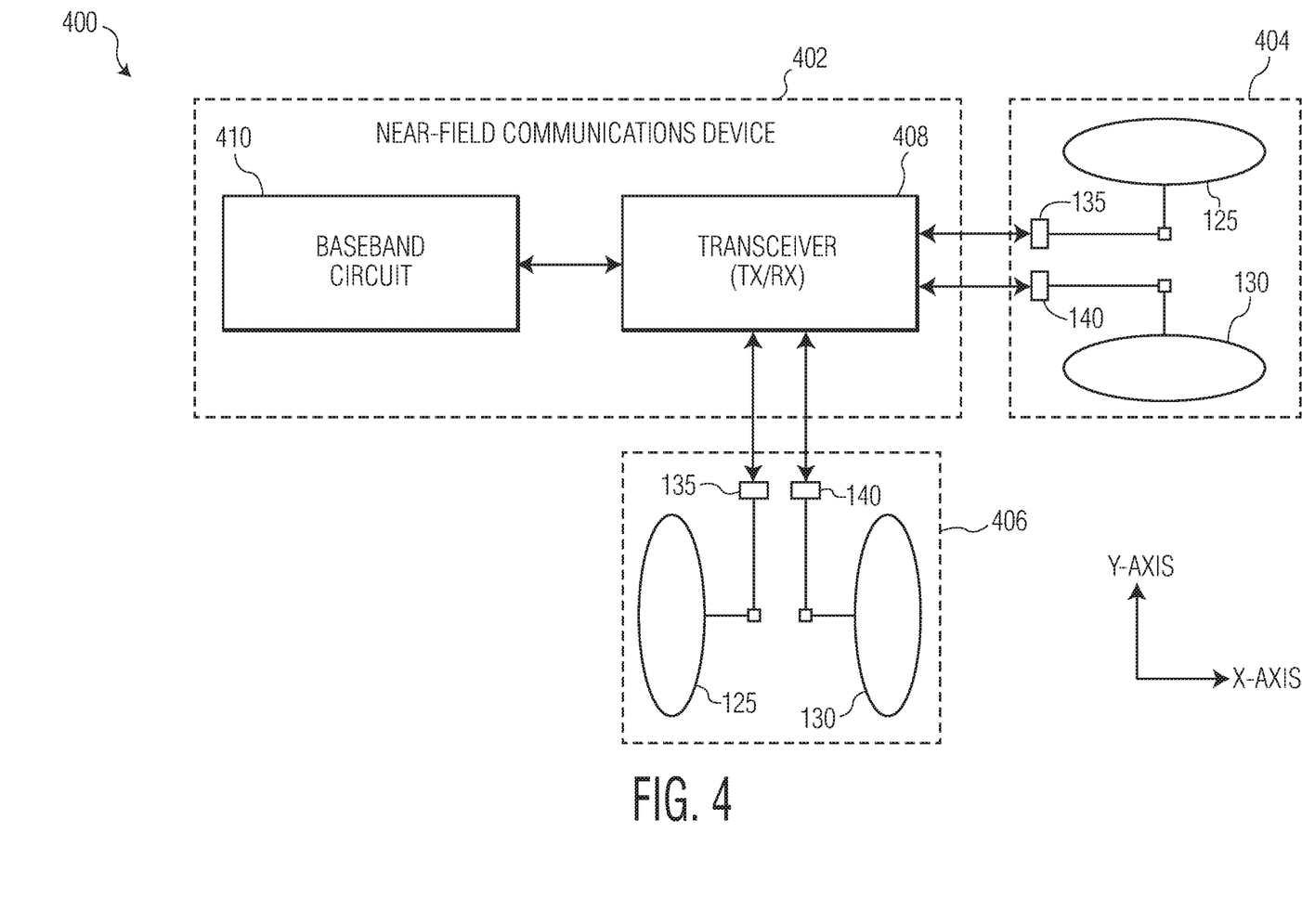
FIG. 4 is an example near-field communications device according to one example embodiment.

FIG. 4 is an example 400 near-field communications device 402. The example 400 shows a near-field communications device 402, a first near-field electro induction (NFEI) antenna 404, and a second near-field electro induction (NFEI) antenna 406. In alternate embodiments the second antenna 406 need not be an NFEI antenna but could instead be a different type of antenna that is still also able to receive electric (E) near-field signals.

The near-field communications device 402 includes a transceiver circuit 408 and a baseband circuit 410. The first near-field electro induction antenna 404 includes a set of conductive surfaces 125, 130 having a first planar orientation resulting in a first radiation pattern (i.e. the radiated E-field is substantially parallel to Y-axis shown), and a set of connections 135, 140.

The second near-field electro induction antenna 406 includes a set of conductive surfaces 125, 130 having a second planar orientation resulting in a second radiation pattern (i.e. the received E-field is substantially parallel to X-axis shown), and a set of connections 135, 140.

In various example embodiments the first radiation pattern and the second radiation pattern are not spatially aligned (i.e. are not parallel, at 0 degrees, to each other).

Note that while the X-axis and Y-axis shown in FIG. 4 appear perpendicular, in alternate example embodiments can have any angle, other than 0 degrees. Also note that in various example embodiments, the first near-field antenna 404 functions as both a transmit (TX) and receive (RX) antenna, while the second near-field antenna 406 functions only as a receiver (RX).

In one example application the near-field communications device 402 is positioned proximate to (e.g. nearby) a conductive structure (e.g. a human body) and the first planar orientation of the first near-field antenna 404 is configured to be substantially parallel to the conductive structure, while the second planar orientation of the second near-field antenna is configured to be substantially perpendicular to the conductive structure.

Also, in various example embodiments the first near-field antenna 404 includes at least two conductive surfaces, where one of the conductive surfaces is closer to the conductive structure than the other.

The transceiver circuit 408 is configured to subtract a second signal received from the second near-field antenna 406 from a first near-field signal received from the first near-field antenna and thereby generate a third signal.

Figure 6:
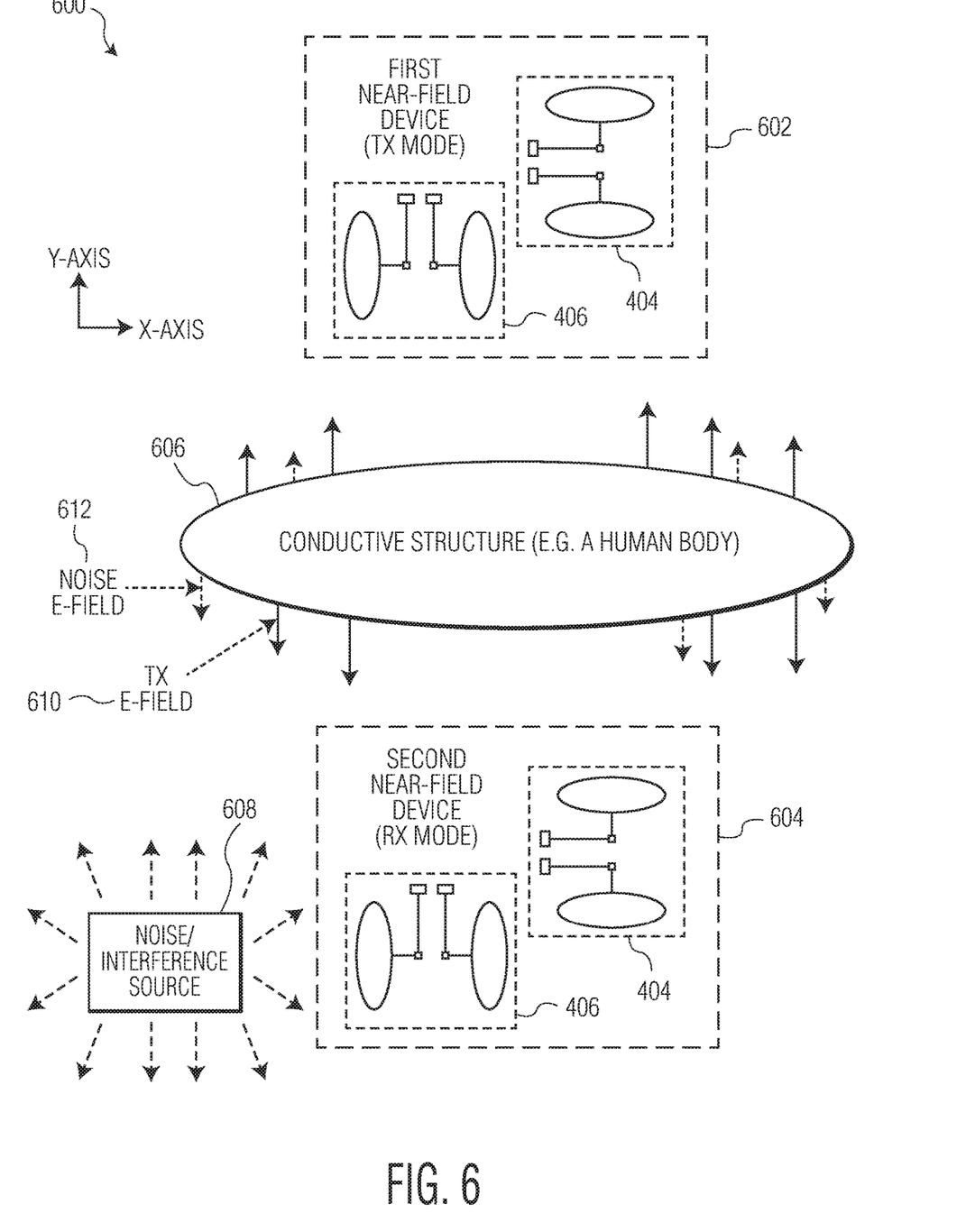
FIG. 6 is an example application of the near-field communications device.

The first near-field signal includes a transmitted (TX) near-field signal from another near-field communications device (see FIG. 6). The second signal includes an interference signal, such as an ambient noise signal from an electric motor, a radio, a light, a household appliance, a printer, a RFID device, or an NFC device. The third signal only includes the transmitted (TX) near-field signal, having had the interference (e.g. noise) subtracted out.

In the example embodiment shown in FIG. 4, the first near-field electro induction antenna 404 is substantially similar to the second near-field electro induction antenna 406 so that other circuit variables are not introduced into the subtraction. However, in alternate embodiments, the first and second antennas 404, 406 can be different, as long as those differences are accounted for during the subtraction.

For example, the first near-field antenna 404 can be responsive to both electric (E) near-fields and magnetic (H) near-fields, while the second near-field antenna 406 is responsive only to electric (E) near-fields.

The baseband circuit 410 is configured to decode and output the transmitted (TX) near-field signal.

Figure 5:
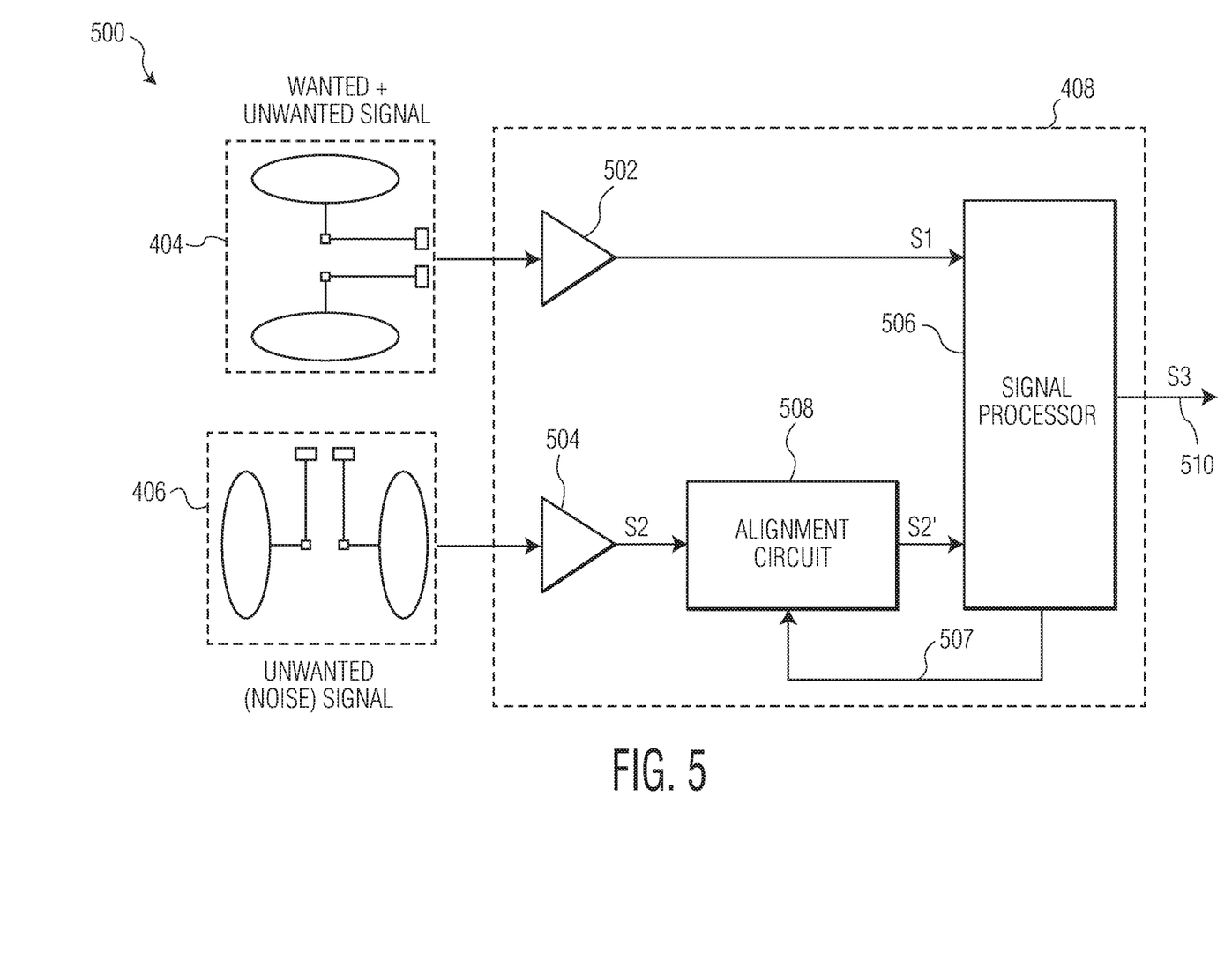
FIG. 5 is an example transceiver circuit within the near-field communications device.

FIG. 5 is an example 500 transceiver circuit 408 within the near-field communications device 402. The example 500 shows a transceiver circuit 408. The transceiver circuit 408 is configured to exchange TX and RX signals (S1) with the first near-field antenna 404 containing a wanted (S1) (e.g. TX signal) from another near-field communications device (see FIG. 6). The transceiver circuit 408 is also configured to receive RX signals (S2) from the second near-field antenna 406 containing unwanted (e.g. noise, interference) signals.

The transceiver circuit 408 includes a first amplifier 502, a second amplifier 504, a signal processor 506, a feedback path 507, an alignment circuit 508, and an output port 510.

The first near-field antenna 404 is connected to the first amplifier 502. The second near-field antenna 406 (e.g. noise/interference sensor) is connected to the second amplifier 504. Both amplifiers may contain their own tuning unit.

The alignment circuit 508 is coupled to receive an amplified version of the first near-field signal (S1) from the first near-field antenna 404 which includes a version of the second signal (S2') having a first amplitude and phase. The alignment circuit 508 is also coupled to receive an amplified version of the second signal (S2) received from the second near-field antenna 406 has a second amplitude and phase.

The alignment circuit 508, under control by the signal processor 506 through the feedback path 507, is configured to adjust the second amplitude and phase (S2) to substantially match the first amplitude and phase (S2'). This phase and amplitude alignment is in response to the unwanted second near-field signal (S2') portion of the wanted+unwanted first near-field signal (S1) captured by the first near-field antenna 404 having a different amplitude and phase than that second near-field signal (S2) captured by the second near-field antenna 406.

The signal processor 506 is coupled to receive the first near-field signal (S1=TX+S2') from the first near-field antenna 404 and the second signal (S2) from the second near-field antenna 406. The signal processor 506 generates a third signal (S3) from subtraction of the second signal from a first near-field signal by subtracting S2' from S1 (i.e. S3=S1-S2'=TX). The subtraction can be done by placing S1 and S2' 180 degrees out of phase.

As introduced above the third signal (S3) was originally transmitted from the another near-field communications device (see. 602 in FIG. 6). Due to the subtraction, the third near-field signal (S3) has a higher SNR and provides more robust near-field communications because the unwanted signal noise (S2') has been removed from the wanted portion (TX) of the first near-field signal (S1).

If the second antenna 406 is substantially perpendicular to the conductive structure (e.g. see 606 in FIG. 6), then the second near-field signal will not receive any of the wanted portion of the signal which is also perpendicular to the conductive structure since the first antenna 404 is parallel to the conductive structure.

In some example embodiments, the signal processor 506 corrects for angular manufacturing/assembly differences between the first planar orientation of the first near-field antenna 404 and the second planar orientation of the second near-field antenna 406 within the near-field communications devices 602, 604 as follows:

TX=S3=near-field signal transmitted by another near-field communications device;

S1=first near-field signal received by the first near-field antenna 404;

S2=second near-field signal from the second near-field antenna 406;

S2'=noise/unwanted/interference signal within the first signal (S1) and having a received amplitude (A');

ω=angle of first antenna's 404 planar surface with respect to the second antenna's 406 planar surface (e.g. ω=90 degrees in an ideal case);

Correction for any manufacturing offset angle between the first antenna 404 and the second antenna 406 within the second near-field communications device 604 is as follows for an interference with a cosine shape:

S1=TX+S2', where

S2'=A' cos(ω)t

S2=A cos(ω+φ)t

S3=S1−S2'

The alignment circuit 508 and/or the signal processor 506 can be embodied in both the digital and/or analog circuit domains. Other alternative algorithms (e.g. wideband interference cancellation algorithms) for removing noise signals from received signals can be used as well. Also, in other example embodiments, two separate receiver chains can be used and signal processor is implemented after frequency conversion.

FIG. 6 is an example 600 application of the near-field communications device 402. The example 600 shows a first near-field communications device 602 (TX Mode), a second near-field communications device 604 (RX Mode), a conductive structure 606, a noise/interference source 608, a transmitted (TX) E-field signal 610 (solid arrows), and an interference (e.g. noise which may or may not be a wholly near-field signal) signal 612 (dotted arrows).

The first near-field communications device 602 (TX Mode) generates the TX E-Field signal 610 perpendicular and conformal to all outer surfaces of the conductive structure 606.

The second near-field communications device 604 (RX Mode) detects the wanted TX E-Field signal 610 but also the unwanted Noise E-field signal 612.

In example embodiments, both the first and second near-field devices 602, 604 have their first E-Field antennas 404 positioned relatively close and parallel to the conductive structure 606 for a better communications link signal strength.

Also, in example embodiments, both the first and second near-field devices 602, 604 have their second E-Field antennas 406 positioned perpendicular to the conductive structure 606 so as to minimize reception of the TX E-Field signal 610.

The noise/interference source 608 represents various unwanted environmental noise sources.

A ratio of the TX E-Field signal 610 to the Noise E-field signal 612 is a signal to interference ratio (SIR) (aka signal to noise ratio (SNR)). A sufficiently high ratio of SIR is required to guarantee data integrity, for example 10 dB or 15 dB depending on the TX signal's modulation scheme.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are affected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field communications device, comprising:
    a receiver configured to be coupled to:
        a first near-field antenna having a first radiation pattern, wherein the first near-field antenna is responsive to both electric (E) near-fields and magnetic (H) near-fields, and
        a second antenna having a second radiation pattern, wherein the first radiation pattern and the second radiation pattern are not spatially aligned, and
    to subtract a second signal that includes an interference signal received from the second antenna from a first near-field signal received from the first near-field antenna, thereby providing interference rejection.

2. The apparatus of claim 1, wherein the first near-field signal includes a transmitted (TX) near-field signal from another near-field communications device.

3. The apparatus of claim 2, wherein the interference signal is an ambient noise signal.

4. The apparatus of claim 2, wherein the interference signal is generated from at least one of: an electric motor, a radio, a light, a household appliance, a printer, a RFID device, or an NFC device.

5. The apparatus of claim 1, wherein the second antenna is a near-field antenna and the interference signal is a near-field signal.

6. The apparatus of claim 1, wherein the near-field communications device includes the first near-field antenna and the and second antenna.

7. The apparatus of claim 1, wherein the near-field communications device is a near-field electro induction (NFEI) device and the near-field communications device is configured to a non-propagating quasi-static electric near-field signal.

8. The apparatus of claim 1, wherein the near-field communications device is a near-field electromagnetic induction (NFEMI) device and the near-field communications device is configured to receive a non-propagating quasi-static magnetic near-field signal.

9. The apparatus of claim 1, wherein the second antenna is responsive only to electric (E) near-fields.

10. The apparatus of claim 1, wherein the first radiation pattern and the second radiation pattern are substantially perpendicularly aligned.

11. The apparatus of claim 1, wherein the first near-field antenna has a first planar orientation, the second antenna has a second planar orientation; and the first planar orientation and the second planar orientation are not parallel to each other.

12. The apparatus of claim 11, wherein the first planar orientation and the second planar orientation are substantially perpendicular to each other.

13. The apparatus of claim 1, wherein the first planar orientation of the first near-field antenna is configured to be substantially parallel to a conductive structure and the second planar orientation of the second near-field antenna is configured to be substantially perpendicular to the conductive structure.

14. The apparatus of claim 13, wherein the first near-field antenna includes at least two conductive surfaces and wherein one of the conductive surfaces is closer to the conductive structure.

15. The apparatus of claim 13, wherein the conductive structure is a human body.

16. The apparatus of claim 1, further comprising:
    an alignment circuit coupled to the second antenna, wherein the first near-field signal received from the first near-field antenna includes the interference signal having a first amplitude and a first phase, the interference signal received from the second antenna has a second amplitude and a second phase, and the alignment circuit is configured to adjust the second amplitude and the second phase to substantially match the first amplitude and the first phase.

17. The apparatus of claim 16, further comprising:
    a signal processor coupled to receive the first near-field signal received from the first near-field antenna and the interference signal from the second antenna, wherein the signal processor is configured to transmit a feedback signal to the alignment circuit that commands the alignment circuit to adjust the second amplitude and the second phase to substantially match the first amplitude and the first phase.

18. The apparatus of claim 2, wherein the receiver is configured to generate a third signal from subtraction of the interference signal from a first near-field signal, and wherein the third signal includes the transmitted (TX) near-field signal from the another near-field communications device, and further comprising:
    a baseband circuit configured to decode and output the transmitted (TX) near-field signal.

19. The apparatus of claim 1, wherein the first near-field antenna functions as both a transmit (TX) and receive (RX) antenna, while the second antenna functions only as a receiver (RX) antenna.

20. The apparatus of claim 1, wherein the near-field communications device is embedded in at least one of a wearable device, an earbud, a medical monitoring device, a smartwatch or an implant.

* * * * *